United States Patent
Ehlert

[15] 3,676,899
[45] July 18, 1972

[54] CABLE SHACKLE

[72] Inventor: Delbert D. Ehlert, Lake Olympia Road, Grass Valley, Nevada County, Calif. 95945

[22] Filed: March 5, 1971

[21] Appl. No.: 121,491

[52] U.S. Cl. .............................................. 24/122.6, 24/126
[51] Int. Cl. ......................................................... F16g 11/04
[58] Field of Search ................... 24/122.6, 126 L, 136 L, 126, 24/122.3; 52/230, 223 L

[56] References Cited

UNITED STATES PATENTS

| | | | |
|---|---|---|---|
| 1,975,683 | 10/1934 | Childs | 24/126 R |
| 3,254,383 | 6/1966 | Ehmann | 24/122.6 |
| 3,475,795 | 11/1969 | Youngblood | 24/122.6 |

*Primary Examiner*—Bernard A. Gelak
*Attorney*—Mellin, Moore & Weissenberger

[57] ABSTRACT

A clamp for a convolute wire cable or the like including a socket member having a conically tapered recess extending therethrough and a unitary inner core portion of substantially conico-frustrum configuration seated in the recess with the convolute strands of the cable being secured within helical grooves formed on the outer periphery of the core portion. The core portion includes an elongated conically tapered smooth bore extending along its longitudinal center axis and has one side thereof enlarged with respect to the other. An inner wedge is disposed in the enlarged side of the bore and mates with the other side forming a cylindrical central bore for receiving the center strand of the cable therein. In this manner, the inner wedge may be hammered down into the enlarged side of the bore to firmly grip the center strand of the cable while the socket member is forced onto the core portion to firmly grip the convolute strands of the cable within the socket member.

7 Claims, 5 Drawing Figures

Patented July 18, 1972 3,676,899
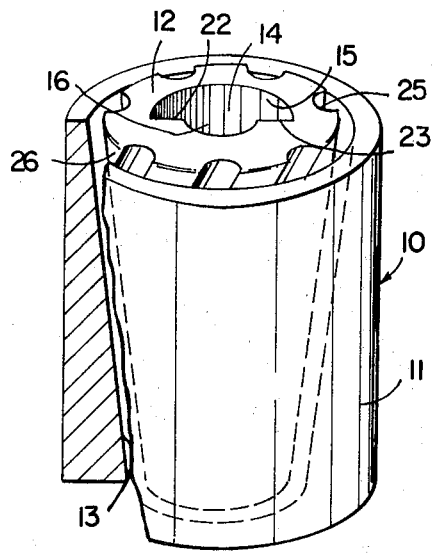
FIG_1
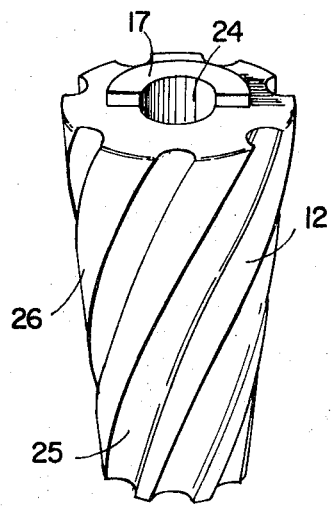
FIG_2
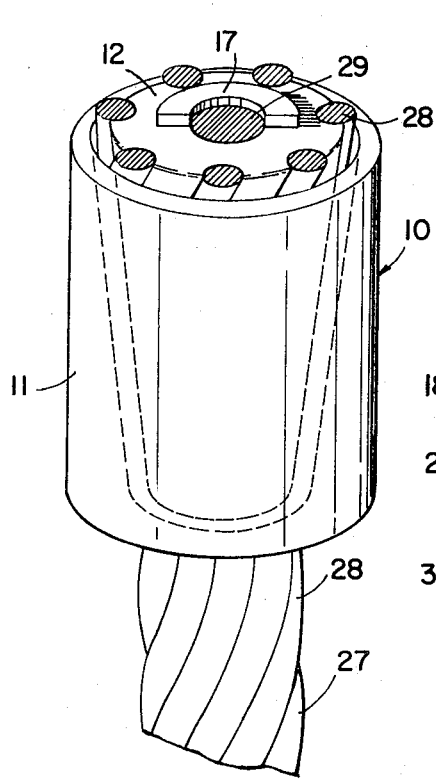
FIG_4
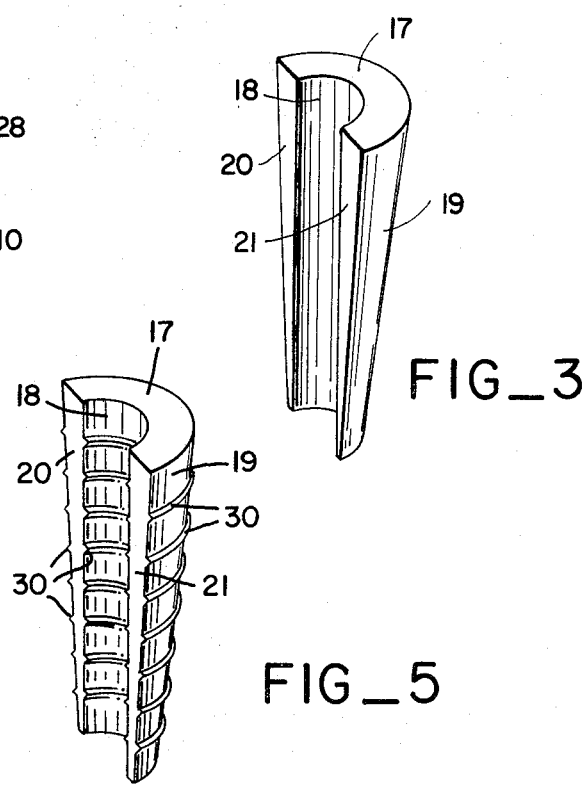
FIG_3
FIG_5
INVENTOR.
DELBERT D. EHLERT
BY
Mellin, Moore & Weissenberger
ATTORNEYS

3,676,899

CABLE SHACKLE

BACKGROUND OF THE INVENTION

1. Field of the Invention

The invention relates to cable shackles; and, more particularly to a clamp for firmly gripping one end of a cable and holding this end in a secure manner while the cable undergoes tension or the like.

2. Description of the Prior Art

Cable shackles are well known in the art. Such shackles generally include a ferrule having a frictional wedge block fitting therein for gripping therebetween the convolute strands of a wire cable or rope or the like. Most of these devices do not develop the full strength of the cable. When the wedge blocks and ferrule are relatively rigid and unyielding, the wedge blocks do not come into sufficiently intimate gripping relationship with all of the strands of the cable and the individual wires in each strand, which are also relatively hard and unyielding. The clamping pressure tends to be concentrated more at certain points than others, causing some of the wires to be damaged and weakened.

Wedge blocks which hold the wires in straight untwisted positions tend to overstress the strands by placing relatively sharp bends at the transition points where their directions change abruptly from the spiral lay of the cable. Some of these difficulties have been solved by prior art clamps using a plurality of wedge blocks having spiral grooves but the proper placement of a plurality of wedge blocks is difficult to accomplish when out in the field where the ropes or cables are large and the strands relatively stiff. A single wedge block which fits the lay of the strands is desirable. However, the need exists for a cable shackle using such a block which can be used conveniently in the field with all sizes of wire cables or the like.

SUMMARY OF THE INVENTION

It is an object of this invention to provide a cable clamp having a unitary wedge block which grips the convolute strands of a cable therein in a firm manner.

It is a further object of this invention to provide such a clamp whereby the center strand of the cable may be secured therein by means of a removable wedge which can be quickly and conveniently applied in field use.

These and other objects are preferably accomplished by providing a socket member having a conically tapered recess extending therethrough and a unitary inner core portion of substantially conico-frustrum configuration seated in the recess with the convolute strands of the cable being secured within helical grooves formed on the outer periphery of the core portion. The core portion includes an elongated conically tapered smooth bore extending along its longitudinal center axis and has one side thereof enlarged with respect to the other. An inner wedge is disposed in the enlarged side of the bore and mates with the other side forming a cylindrical central bore for receiving the center strand of the cable therein. In this manner, the inner wedge may be hammered down into the enlarged side of the bore to firmly grip the center strand of the cable while the socket member is forced onto the core portion to firmly grip the convolute strands of the cable within the socket member.

BRIEF DESCRIPTION OF THE DRAWINGS

FIG. 1 is a perspective view of a cable shackle in accordance with the invention, a portion of the ferrule sleeve being broken away for illustration;

FIG. 2 is a perspective view of the core portion of the shackle of FIG. 1 having a removable wedge disposed therein in accordance with my invention;

FIG. 3 is a perspective view of the removable wedge of FIG. 2;

FIG. 4 is a perspective view similar to FIG. 1 showing the shackle of FIG. 1 as applied to a wire cable or the like; and FIG. 5 is a view similar to FIG. 3 showing a modified removable wedge.

DESCRIPTION OF THE PREFERRED EMBODIMENT

Referring now to FIG. 1 of the drawings, a cable shackle 10 is shown having an outer ferrule or socket member 11. A unitary inner wedge or core portion 12 is shown disposed in socket member 11. The socket member 11 is shown as generally cylindrical in outer configuration but may take any desired shape and may include means thereon (not shown) for anchoring the socket member 11 to some supporting structure thus in turn anchoring the cable carried thereby.

Socket member 11 includes a generally conically tapered recess 13 therein as indicated by the dotted lines in FIG. 1. The wall portions defining recess 13 are smooth as shown. When a cable is pulled downwardly into the interior of the socket member 11, as will be described further hereinbelow, the smooth wall portions slide against the outer convolute strands of the cable, and through their convergence, bring these strands together; the wall portions, since they are smooth, accommodate twisting of the strands as they are brought together, and sliding of the strands downwardly through socket member 11.

Core portion 12, which is adapted to be seated in recess 13, has a generally conico-frustrum outer configuration, as can best be seen in FIG. 2, which complements the configuration of recess 13. In other words, core portion 12 is so configured as to smoothly fit into recess 13 in a relatively snug manner as can be seen in FIG. 1. Core portion 12 is a unitary piece and includes a smooth-walled elongated bore 14 extending along the axial center thereof. Bore 14 includes an enlarged portion 15 (FIG. 1) that is also smooth-walled and generally conically tapered in the manner of the outer configuration of core portion 12. The other portion 16 of core portion 12 is smooth-walled and generally semi-cylindrical.

A removable inner wedge 17 is adapted to be extended down along enlarged portion 15, for reasons to be discussed hereinbelow. This inner wedge 17 is shown disposed in place in FIG. 2 and in detail in FIG. 3. As can be best seen in FIG. 3, inner wedge 17 is smooth-surfaced on both its inner and outer surfaces 18 and 19, respectively, with outer surface 19 adapted to conform to the configuration of enlarged portion 15, and thus being semi-conically tapered as shown. The flat sides 20 and 21 of inner wedge 17 abut against shoulders 22 and 23, respectively, at the junction of enlarged portion 15 and the other remaining portion 16 which forms elongated bore 14 as shown in FIG. 1. In this manner, a generally cylindrical central bore 24 is formed extending through core portion 12 as shown in FIG. 2. This central bore 24 is adapted to receive the center core strand of the cable to be inserted into shackle 10 as will be discussed further hereinbelow. Thus bore 24 is slightly less in internal diameter than the cross-sectional diameter of the center strand of the cable to be inserted into shackle 10.

A plurality of elongated helical grooves 25 extend over the outer surface of core portion 12 extending in the direction of its longitudinal axis. These grooves 25 wind about the periphery of core portion 12 and are adapted to receive the convolute strands of a cable. Since the grooves have a helical twist, the strands of the cable need not be straightened appreciably to place them into grooves 25. Grooves 25 are separated by smooth-surfaced lands 26.

The mounting of the free end of a cable to the shackle 10 will now be described. In operation, the socket member 11 is slid into the free end of cable 27 (FIG. 4). The helical strands 28 of cable 27 are separated and placed within helical grooves 25 so that strands 28 coincide therewith while the center strand 29 of cable 27 is passed through bore 14 (i.e., prior to the insertion of removable inner wedge 17). Inner wedge 17 is then placed into enlarged portion 15 of bore 14 and against center strand 29, as discussed hereinabove, and hammered down or otherwise forced into portion 15 until its smooth inner wall surface 18 firmly grips the center strand 29 of cable 27. The socket member 11 is then forced onto core portion 12 and the outer helical strands 28 thus firmly gripping cable 27 within socket member 11.

In this manner, a sure, positive and firm connection can be made readily and quickly when it is desired to anchor the free end of a wire cable to a ferrule or socket member. This socket member may then, in turn, be secured in place as desired. The unitary construction of my core portion possesses advantages over prior art devices which use a plurality of sections to make up a single core portion in that it may be manufactured in a manner that does not require close tolerances for mating up such sections. My removable inner wedge can also be readily manufactured in a manner that does not require particularly close attention to tolerances and the like. Thus, only two parts are used, whereas certain prior art devices accomplish what I accomplish using a plurality of such parts.

If desired, a plurality of circumferential serrations 30 may be applied about the inner and outer surfaces 21 and 19 of wedge 17 (FIG. 5). These serrations 30 provide an improved gripping surface against both the inner surface of smooth-walled bore 14 and the outer surface of center strand 29.

I claim as my invention:

1. A clamp for a cable or the like wherein said cable comprises a plurality of outer convolute strands surrounding a center strand, said clamp comprising:
   a. a socket member having a conically tapered recess extending therethrough;
   b. a unitary inner core portion of substantially conico-frustrum configuration, said inner core portion being adapted to seat in said recess while clamping onto the convolute outer strands of said cable, said core portion having a plurality of helically formed external grooves extending in the direction of the longitudinal center axis of said core portion formed in the outer periphery thereof for receiving said convolute strands therein, said core portion having an elongated conically tapered bore extending substantially along its longitudinal center axis and having one side thereof enlarged with respect to the other to accommodate an inner wedge therein; and
   c. an inner wedge having an outer surface conforming substantially to the enlarged conically tapered side of said bore and an inner surface adapted to mate with the other side of said bore to form a generally cylindrical central bore for receiving and gripping therebetween the center strand of said cable.

2. The clamp of claim 1 wherein said helically formed grooves are separated by lands having a smooth outer surface and the walls of said tapered recess are smooth-faced.

3. The clamp of claim 1 wherein all of the walls of said conically tapered bore are smooth-faced and the outer and inner surfaces of said wedge are smooth-faced.

4. The clamp of claim 1 wherein both the enlarged side of said conically tapered bore and the other side thereof are substantially semi-circular in cross-section with said enlarged side being substantially greater in diameter than the diameter of said other side at the point of greatest diameter of said core portion and gradually tapering downwardly to the point of smallest diameter of said core portion, the diameter of said enlarged side being substantially equal to the diameter of said other side at the point of smallest diameter of said core portion.

5. The clamp of claim 1 whereby said inner wedge is generally semi-circular in cross-section and has an inner diameter substantially equal to the diameter of said other side and an outer diameter at its point of greatest outer diameter substantially equal to the diameter of said enlarged side at the point of its greatest diameter and gradually tapering downwardly to a diameter substantially equal to the point of the smallest diameter of said enlarged side.

6. The clamp of claim 5 wherein said inner wedge fits securely in said enlarged side and mates with said other side in a manner forming said generally cylindrical central bore, said central bore being slightly less in cross-sectional diameter than the cross-sectional diameter of said center strand of said cable.

7. The clamp of claim 1 wherein a plurality of circumferential serrations are provided along the inner and outer surfaces of said inner wedge.

* * * * *